though in the opposite directions for spin turns by rotating the operating lever 25 to the left or right.

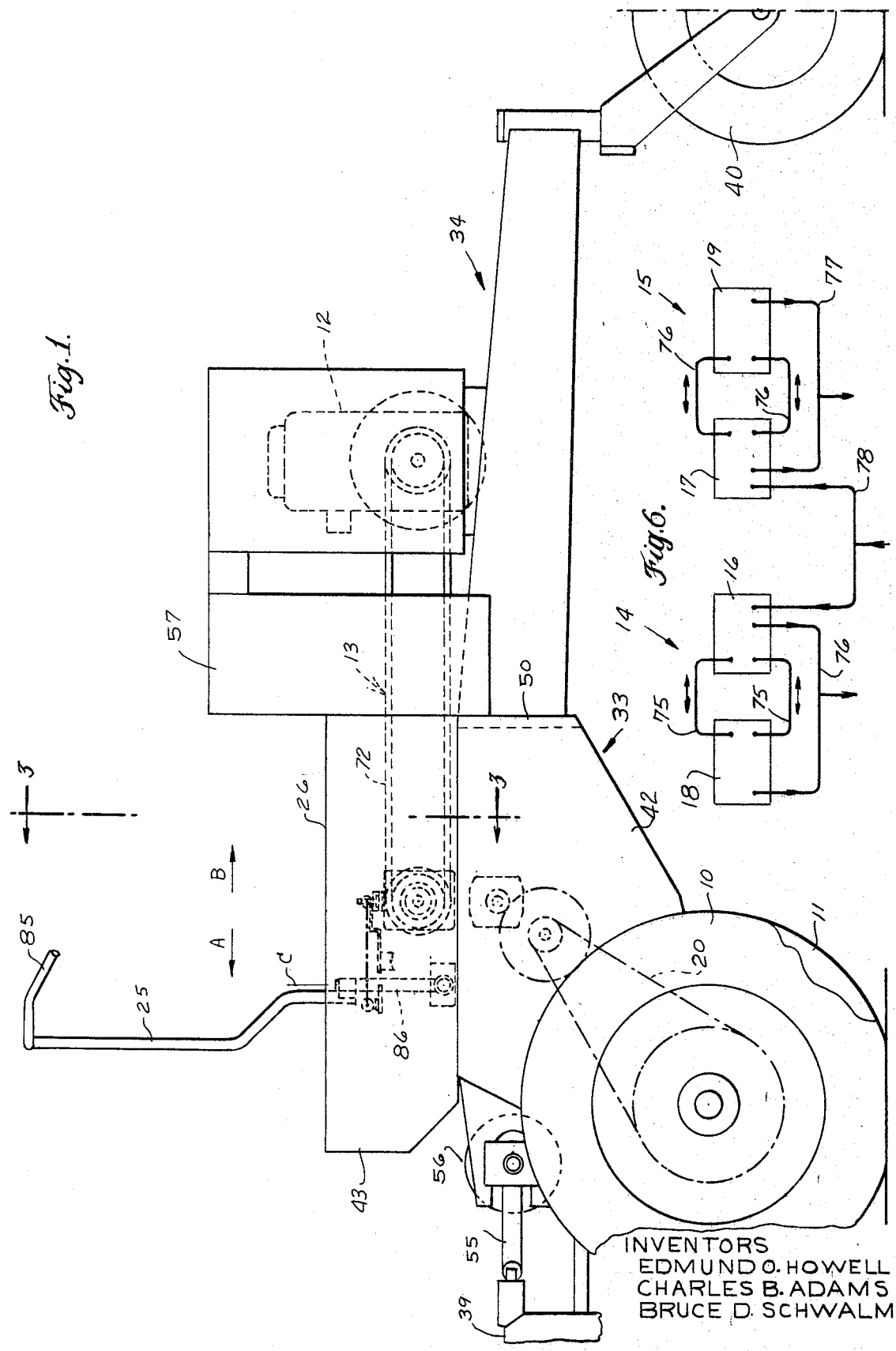

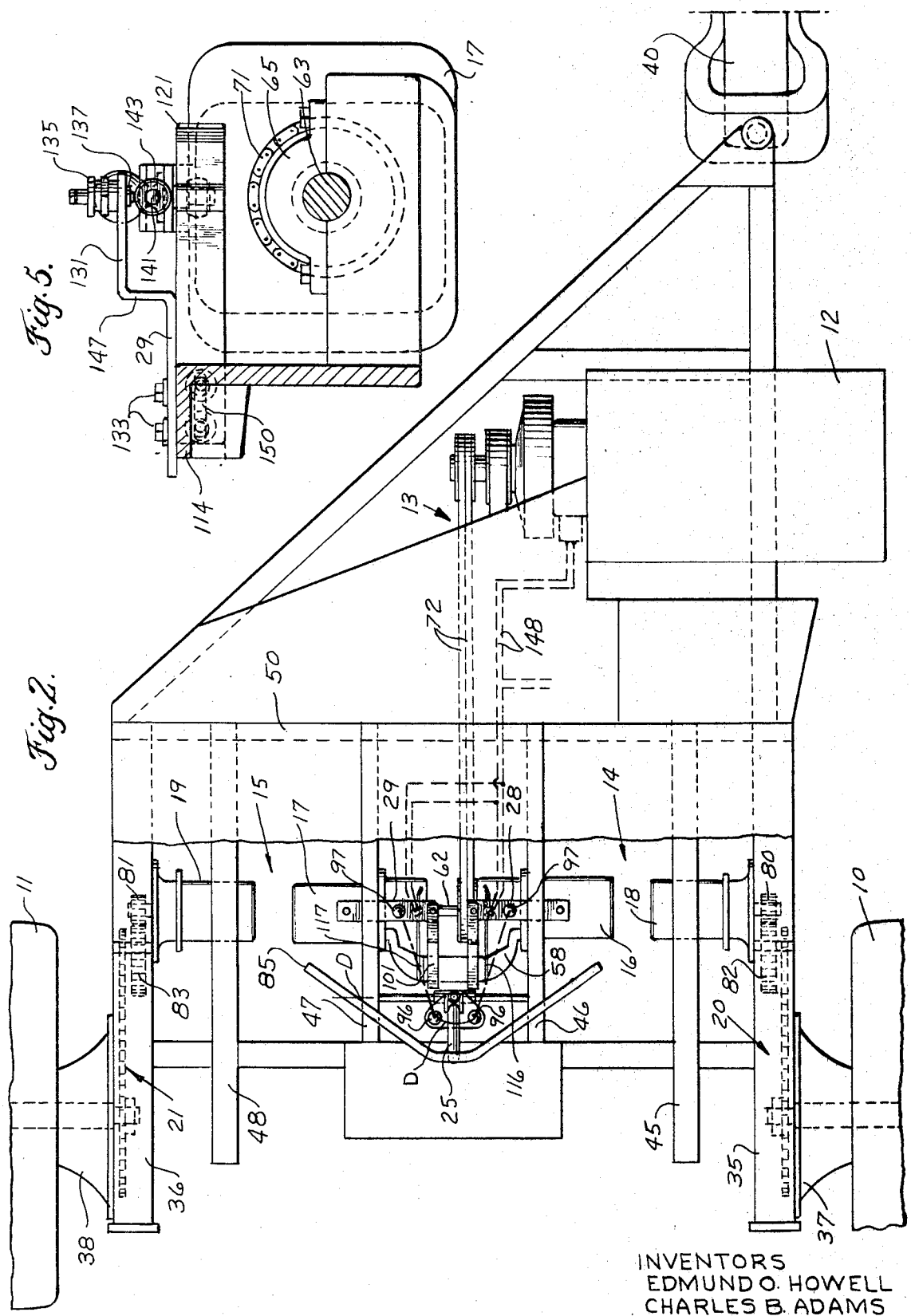

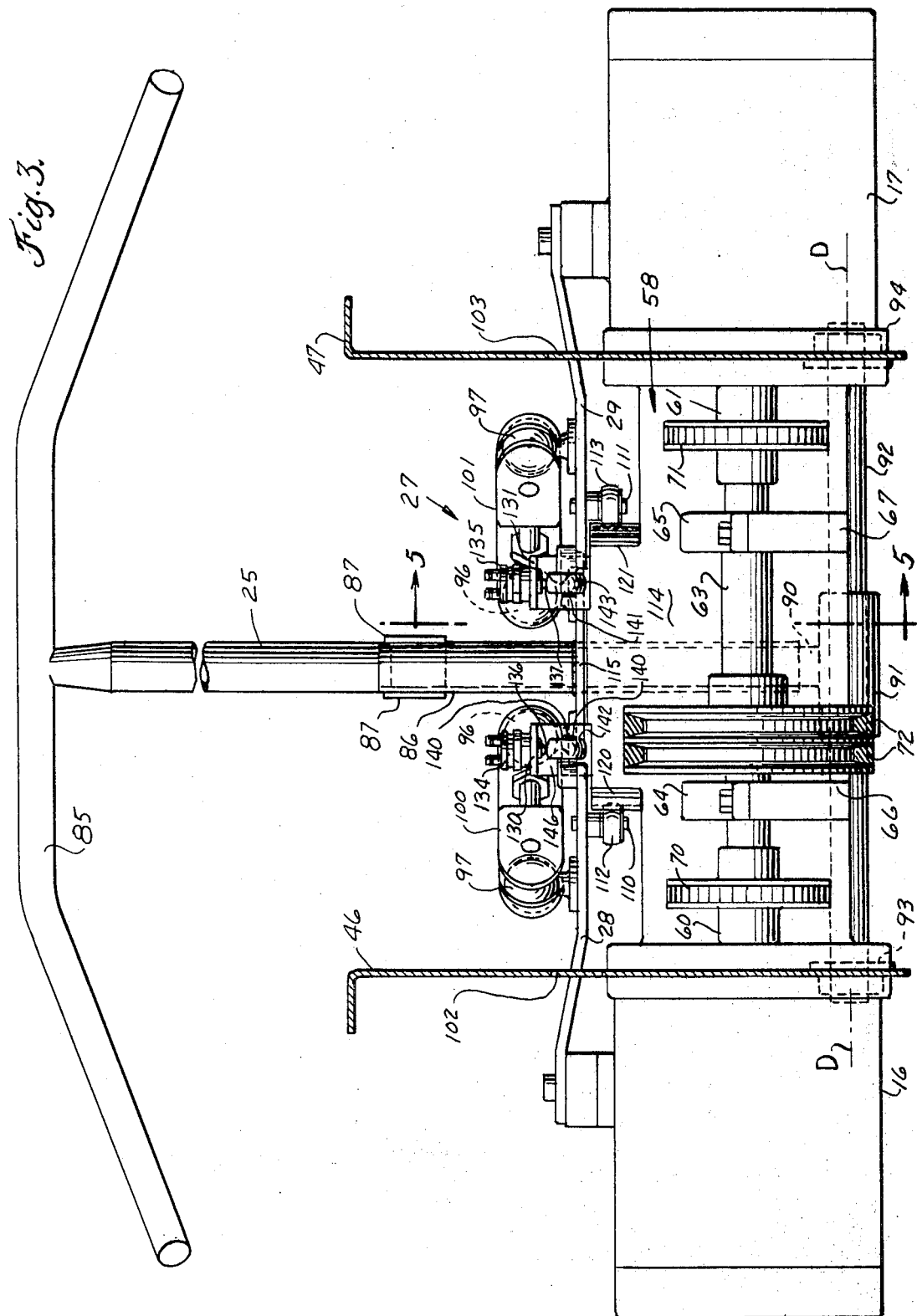

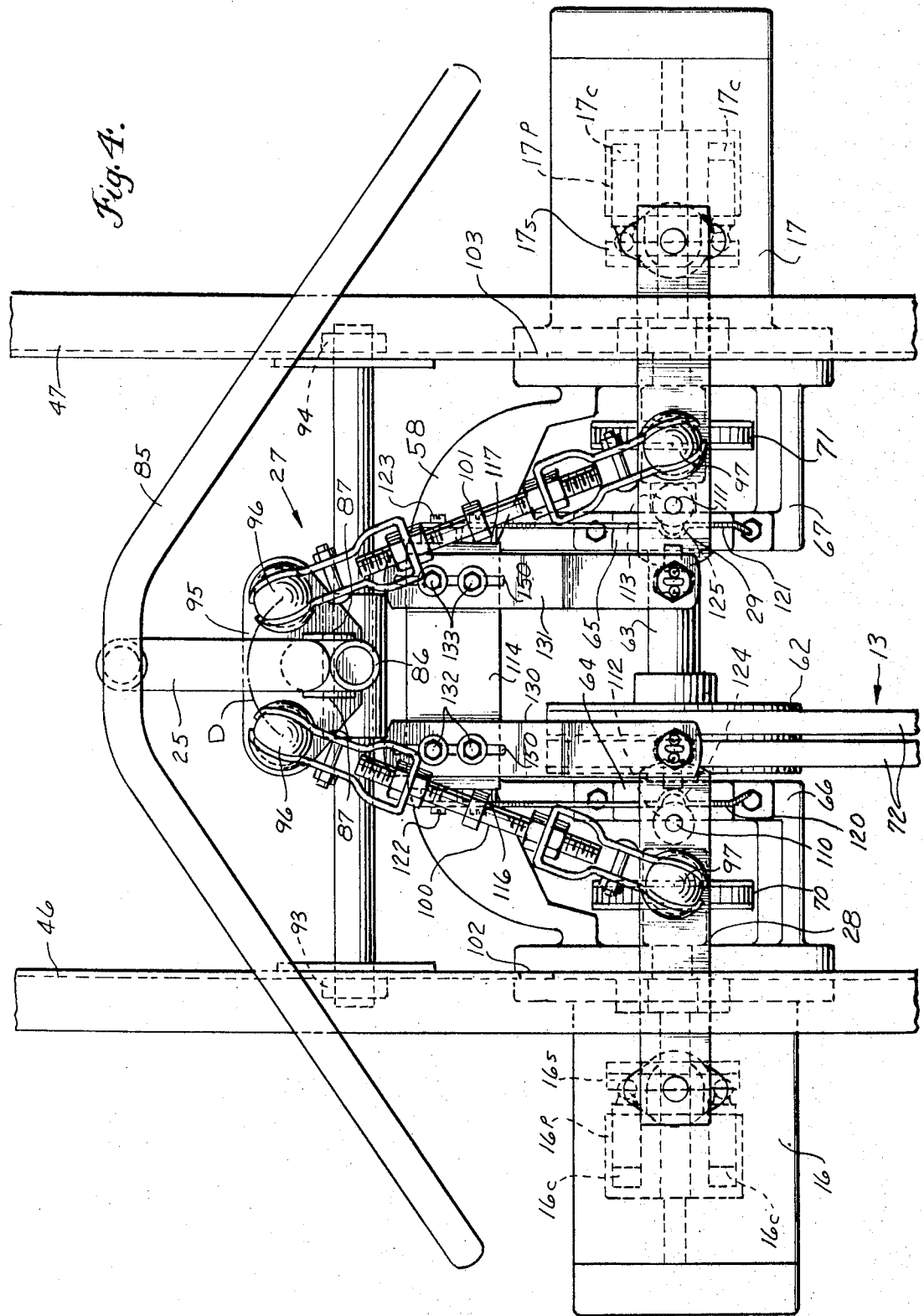

3,526,153
NEUTRAL INDICATING AND IGNITION SWITCHING MEANS IN A CONTROL MECHANISM FOR A DUAL HYDRAULIC TRANSMISSION

Edmund O. Howell and Charles B. Adams, New Holland, and Bruce D. Schwalm, Leola, Pa., assignors to Sperry Rand Corporation, New Holland, Pa., a corporation of Delaware
Filed Apr. 14, 1969, Ser. No. 815,725
Int. Cl. G05g 1/00
U.S. Cl. 74—491                    7 Claims

ABSTRACT OF THE DISCLOSURE

A tractor with two transversely spaced wheels has two sets of hydraulic pumps and motors for separately driving the wheels. The pintle arms on the centrally mounted pumps control the speed of the wheels and are actuated by a single operating lever connected to the pintle arms by a linkage mechanism. Resilient detents are engaged by rollers on the pintle arms which indicate the neutral position of the arms. A second set of rollers on the pintle arms in the neutral positions engage normally opened switches of the starting circuit to close the switches.

BACKGROUND OF THE INVENTION

This invention relates to the operative control of two sets of hydraulic pumps and motors forming transmissions separately driving the front wheels of a tractor and directed particularly to means for indicating the neutral non-operative position of the transmissions and for placing the starting circuit in condition for energization by the ignition switch.

In the operation of tractors carrying a cutting header on the front of the tractor it has become desirable to improve the ease of operating the separate drives for the front wheels of the tractor from a two lever hand operation to a single handle bar type of operation. The tractor operator can then control the forward and rearward speed of the tractor by movement of the single operating lever in a vertical longitudinal plane and control the differential speed between the front wheels by rotative motion of the single control lever. To attain this single control lever operation the front wheels are driven through two sets of hydraulic pumps and motors controlled by a single operating lever connected through a linkage mechanism to the pintle arms of the hydraulic pumps. The pintle arms are connected to the swash plates of a respective pump and by varying the angle of the pintle arms the outputs of the pumps and the motors may be controlled.

One of the shortcomings, however, of this arrangement is that the tractor operator can only determine whether or not the pumps are in a neutral or non-driving position by the position of the operating lever. This observation may not be accurate. One or the other or both of the pumps may not be in neutral position. It is therefore, desirable that the tractor operator should be able to feel by the movement of the operating lever whether or not the transmissions are in neutral position for both of the pumps. Thus by a slight movement in the vertical plane and a slight rotation of the operating lever in both directions the tractor operator will be able to sense whether or not the pumps are in neutral position. Further it is desirable that the operating lever be held in the neutral position and not inadvertently move into a driving condition without an operator in attendance.

Also, as a safety precaution, it is desirable that the engine of the tractor is not able to start when either of the transmissions are in a driving condition. This may produce an abrupt jarring movement of the tractor. Therefore, in connection with the sensing of the neutral position of the pumps, switch means should be provided to render the starter of the engine inoperative except when both of the pumps are in neutral position. The operator should be able to leave the deck with the transmission in neutral and the engine running.

OBJECTS AND SUMMARY OF THE INVENTION

An object of this invention is to provide a manually operated control of a hydraulic transmission with an easily determinable neutral setting.

Another object of this invention is to provide means in a manually operated control of a hydraulic transmission to prevent starting of the driving engine except when the transmissions are in a neutral state.

Another object of the invention is to provide a dual hydraulic transmission control mechanism operated by a single lever with means to indicate neutral positions for both transmissions and to permit the engine starting only when both transmissions are in neutral.

Another object of the invention is to provide dual hydraulic transmissions controlled by a single operating lever with mechanical means to indicate by the feel of lever movement of the operating lever the neutral positions for both transmissions and to disconnect the starter except when both transmissions are in neutral.

In summary a control mechanism with a single operating lever for controlling two sets of hydraulic pumps and motors separately driving the wheels of a self-propelled tractor comprises means to indicate by the feel of the movement of the lever when the pumps are in neutral position and means to connect the starter only when both pumps are in neutral.

Other and further objects and advantages of this invention will be apparent from the following specification and appended claims taken in connection with the drawings which illustrate a preferred embodiment of the invention.

BRIEF DESCRIPTION OF THE DRAWINGS

FIG. 1 is a side view of a tractor.
FIG. 2 is a top fragmentary view of the tractor.
FIG. 3 is an enlarged fragmentary sectional view taken along lines 3—3 of FIG. 1 and illustrates the drive and control means of the hydraulic pumps.
FIG. 4 is a top view of the drive and control means as illustrated in FIG. 3.
FIG. 5 is a detailed view of the safety switch device taken along lines 5—5 of FIG. 3.
FIG. 6 is a schematic view of the hydraulic connections of the two sets of pumps and motors.

DETAILED DESCRIPTION OF PREFERRED EMBODIMENT

Introduction

The tractor is driven in a forward direction A or a rearward direction B by the front wheels 10, 11 and turned either left or right by a speed differential between the wheels. By rotating the wheels in opposite directions the tractor makes a spin turn. The front wheels 10, 11 are driven by an engine 12 through a belt and pulley drive 13 and two sets 14, 15 of hydraulic pumps 16, 17 and motors 18, 19 and chain drive 20, 21 connected to a respective wheel. An operating lever 25 extending above the operating deck 26 of the tractor is connected by a linkage mechanism 27 to the pintle arms 28, 29 of the hydraulic pumps 16, 17, respectively, to control the forward and rearward movement of the tractor by moving the lever 25 in a longitudinal vertical plane forwardly or backwardly. A speed differential can be created between the front wheels 10, 11 or the front wheels may rotate in opposite directions by a rotative motion of the operating lever 25 about the longitudinal axis C.

The tractor has a main frame 33 and an engine supporting frame 34 extending from the rear of the main frame. The front wheels 10, 11 are attached to the casings 35, 36 of the main frame 33 by wheel housings 37, 38 and support the main weight of the tractor including the weight of a header 39 mounted on the front of the main frame by linkage mechanism (not shown). The tractor is supported at the rear by pivotally mounted tail wheel 40 at the apex of the engine supporting frame.

Frame means

The main frame 33 comprises a lower portion 42 and an upper portion 43. The casings 35, 36 with the front wheels 10, 11 form the sides of the lower portion 42 and transverse means 44 extend between the casings for supporting the upper portion. The upper portion 43 has four longitudinally extending support members 45, 46, 47, 48 mounted on the transverse support means 50 of the lower portion 42. On top of the longitudinal beams is the operator's deck 26 with the operating lever 25 extending above the deck.

On the front of the main frame a power take-off 55 extends from a belt and pulley drive 56 at the front center of the lower portion 42 to side of the header 39. The engine 12 is intermediately mounted on the engine supporting frame 34 and a casing 57 is mounted adjacent the main frame 33 for housing the gasoline tank 12 and other operating elements of the tractor. The front guard rail, operator's seat, control pedestal, mounting steps and other elements have been omitted. The operator can stand or sit and move the operating lever 25 forwardly, rearwardly and turn it right or left for controlling the speed and direction of movement of the tractor. Between the two center longitudinally extending beams is a U-shaped casting 58 fastened to the beams and for forming a support for the pumps and other driving and control elements later described herein.

Drive means

The hydraulic pumps 16, 17 are mounted on the U-shape casting 58 and have the driven shafts 60, 61 extending inwardly in axial alignment. The driven pulley 62 of the belt and pulley drive 13 from the engine is mounted on the shaft 63 rotatably supported in the bearing means 64, 65 securely held by the L-shape portions 66, 67 of the casting. The pulley shaft 63 is in axial alignment with the shafts 60, 61 of the pumps and are connected respectively thereto by flexible couplings 70, 71 to accommodate any slight misalignment of the shafts. The two belts 72 are coupled to the pulley on the output shaft of the engine for driving the hydraulic pumps.

The hydraulic pumps 16, 17 as illustrated in FIG. 4 are of the axial type and have cylinders 16c, 17c with a plurality of axially extending bores 16b, 17b and pistons 16p, 17p. The strokes of the pistons 16p, 17p are controlled by swash plates 16s, 17s which may be tilted to arrange different angles to vary the output of the pumps 16, 17 and the direction of flow of hydraulic fluid. The swash plates 16s, 17s and pistons 16p, 17p are shown in neutral position. The position of the swash plates 16s, 17s is controlled by the pintle arms 28, 29 extending inwardly between the center beams 46, 47. Forward movement of the pintle arms rotates the swash plates so that the front wheels drive in a forward direction. A rearward movement of the pintle arms 28, 29 from the neutral rotates the front wheels in a backward direction. With the pintle arms 28, 29 in the neutral position as shown in FIG. 4 the wheels are stationary.

The hydraulic pumps 16, 17 are connected to the hydraulic motors 18, 19 by the oil pressure pipes 75, 76 as illustrated in FIG. 6. The arrows indicate the reversal of fluid flow with a reversal of the pintle arms. The pipes 76, 77 connecting the pumps and motors and the pipes 78 connecting the pumps provide for a circulation of oil through an oil reservoir and filter (not shown).

The hydraulic motors 16, 17 are mounted on the inner sides of the castings 58 with the driven shafts 60, 61 extending into the castings and having spur gears 80, 81 engaging the larger gears 82, 83 driving the chain drives 20, 21 of the respective wheels 10, 11.

Actuating mechanism

The pintle arms 28, 29 of the hydraulic pumps 16, 17 are actuated by the operating lever 25 with the V-shape handle bars 85 through the linkage mechanism 27 within the upper frame 43 of the tractor. The operating lever 25 is part of the linkage mechanism and is attached to sleeve 86 by welding of strips 87. The sleeve 86 slidably fits on a post 90 to rotate about the longitudinal axis C of the post 90. The post 90 is rigidly fastened to a sleeve 91 which is in turn fixedly secured to a pivotal shaft 92. The pivotal shaft 92 is rotatably mounted in bearings 93, 94 on beams 46, 47. The shaft rotates about an axis D. The tractor operator grips the handle bars 85 to move the operating lever 25 back and forth and to rotate it about axis C.

A bracket 95 positioned on the sleeve 86 extends normal to the sleeve and has balls 96 fastened thereto on opposite sides of the vertical longitudinal plane. The pintle arms 28, 29 also have similar balls 97 attached thereto spaced inwardly from the connection of the pintle arms to the swash plates. The balls 96, 97 are connected by links 100, 101 extending at a slight angle to the longitudinal plane and converging forwardly. The forward balls 96 on the bracket are closer together than the rearward balls 97 on the pintle arms. Thus as the operating lever 25 is moved forward the links 100, 101 draw the pintle arms 28, 29 forward and as the operating lever is moved rearward the pintle arms are moved rearward. The wheels 10, 11 are rotated forwardly or rearwardly at the same speed. On rotation of the operating lever 25 from in a neutral position one pintle arm is moved forward and the other pintle arm is moved rearward to produce an opposite rotation of the front wheels. If the operating arm 25 is either forward or rearward on rotation a differential in speeds between the front wheels may be produced.

As best illustrated in FIG. 3 the pintle arms 28, 29 are pivotally mounted on top of the hydraulic pumps 16, 17 on the opposite sides of the center beams 46, 47 and extend inwardly through openings 102, 103 in the center beams. Inwardly from the balls on the pintle arms, shafts 110, 111 are mounted on the pintle arms and extend downwardly for supporting rollers 112, 113 beneath the pintle arms. On the transversely extending main portion of the casting 58 there is an extension 114 on the top with a top surface 115 and two vertically extending sides 116, 117. Resilient metal member 120, 121 are securely fastened to the vertical sides by bolts 122, 123 and extend rearwardly past the rollers 112, 113 on the pintle arms in the neutral position. The members 120, 121 have U-shaped detents 124, 125 in which the rollers rest when in the neutral position. On forward or rearward movement of the pintle arms by the respective links, the rollers will move in or out of the respective detents. This movement produces a resistance to the movement of the operating lever 25 which indicates that the pintle arms 28, 29 are at a neutral position. On the rearward and forward movement of the operating lever 25 the rollers 112, 113 ride against the outwardly facing sides of the members.

On top of the extension 114 of the casting 58 adjacent the vertical sides 116, 117 are mounting strips 130, 131 securely fastened to the mounting block 114 by bolts 132, 133 and extend to the neutral position of the pintle arms. Switches 134, 135 are mounted on top of the mounting strips 130, 131 and have plungers 136, 137 extending downwardly through the mounting strips. The pintle arms 28, 29 have shafts 140, 141 mounted on the upper surface at adjacent ends and support rollers 142, 143 engaging the respective plungers 136, 137 when the pintle arms 28, 29 are in the neutral position. The mounting strips 130, 131 have intermediate portions 146, 147 at right angles to position the ends of the mounting strips in proper relation to the rollers 142, 143 on the pintle arms 28, 29. The mounting strips and the detent strips may have slots 150 for adjusting positions of the switches and detents in relation to the pintle arms for proper registry at the neutral position. As illustrated in FIG. 2 the switches are electrically connected to the engine and starter (not shown) by the lines 148.

Features of the invention

It is thus seen that the operator can readily move the operating lever fore-and-aft and rotate the lever left or right and be able to feel through the operating lever and handle bars when one or the other or both of the pumps are in neutral. The neutral detents are in addition to any friction means that may be provided to hold the operating lever in any given position. Thus the operator may determinably find by the feel of the operating lever the neutral position and isolate the two front drive wheels from the engine while the engine is running.

The starter circuit has switches connected in series so that the engine can only be started when the pintle arms are in the neutral positions. Thus the detents and switches provide a positive indication of the neutral position of the pintle arms and the closing of the starter circuit.

While this invention has been described in connection with a single embodiment, it will be understood that this embodiment is capable of modification and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. In combination with two pintle arms, a linkage system for positioning said two pintle arms extending towards one another in the same level by a single operating lever, resilient members extending generally in direction of movement of the pintle arms and beyond the aligned neutral positions of said pintle arms, said members having detent means, said pintle arms having means resiliently engaging said detent means when said pintle arms are in the neutral position to provide resistance to the movement to said pintle arm thereby indicating on movement of the lever when the pumps are in neutral.

2. In the combination of claim 1 wherein said pintle arms are horizontal and pivot in a horizontal plane and said resilient members are in a vertical plane.

3. In the combination of claim 2 wherein said resilient members are perpendicular to said pintle arms and said pintle arm means comprise rollers thereon rotating about vertical axes.

4. In the combination of claim 1 wherein means with switches are provided engaged by said pintle arms in the neutral position to actuate said switches.

5. In the combination of claim 4 wherein said means with switches comprises mounting strips supporting said switches and said pintle arms have cam means engaging said switches.

6. In the combination of claim 5 wherein said cam means comprises shafts on said pintle with rollers thereon engaging said switches.

7. In the combination of claim 4 wherein said resilient members and said mounting strips are at right angles.

References Cited

UNITED STATES PATENTS 3,181,389   5/1965   Richard _____ 74—480

MILTON KAUFMAN, Primary Examiner

U.S. Cl. X.R.

74—471; 103—38, 162; 180—6.48